Figure 12:
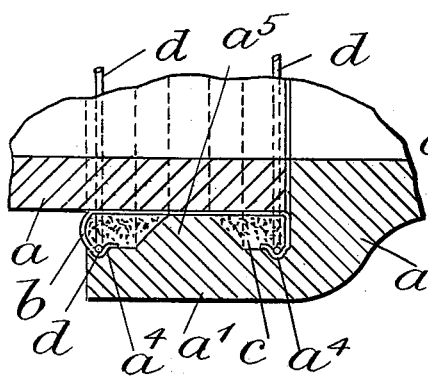

No. 615,149. Patented Nov. 29, 1898.
J. FARLEY.
JOINT FOR EARTHENWARE OR OTHER PIPES.
(Application filed Dec. 28, 1897.)
(No Model.) 3 Sheets—Sheet 1.
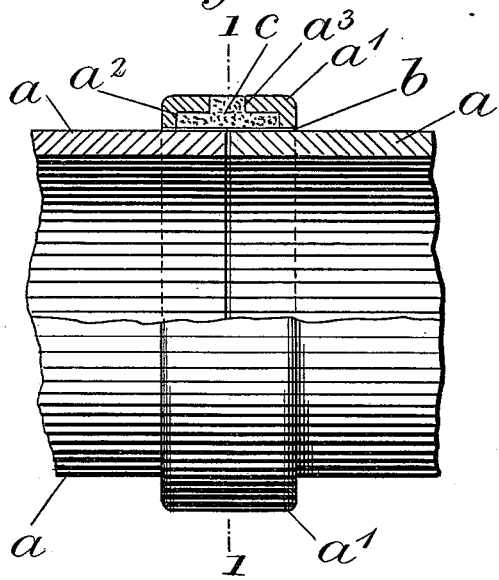
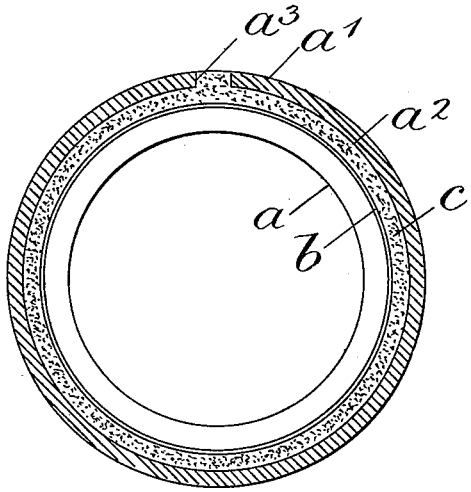
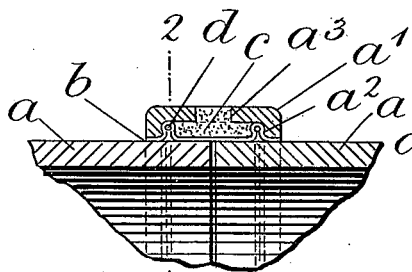
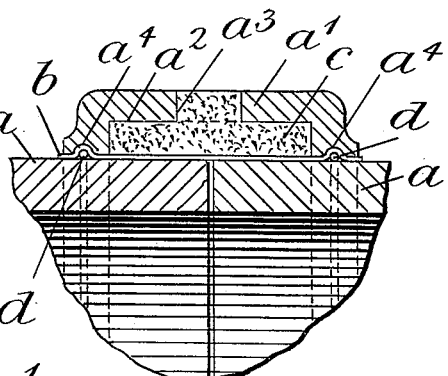
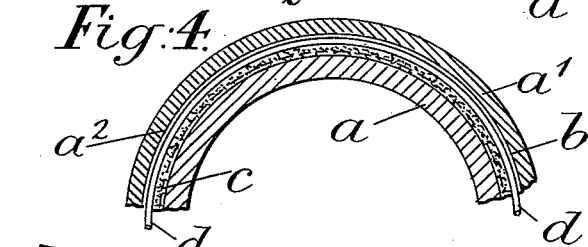
WITNESSES:
S. W. Wright
S. C. Connor
INVENTOR
JAMES FARLEY
by his attorneys
Howson and Howson

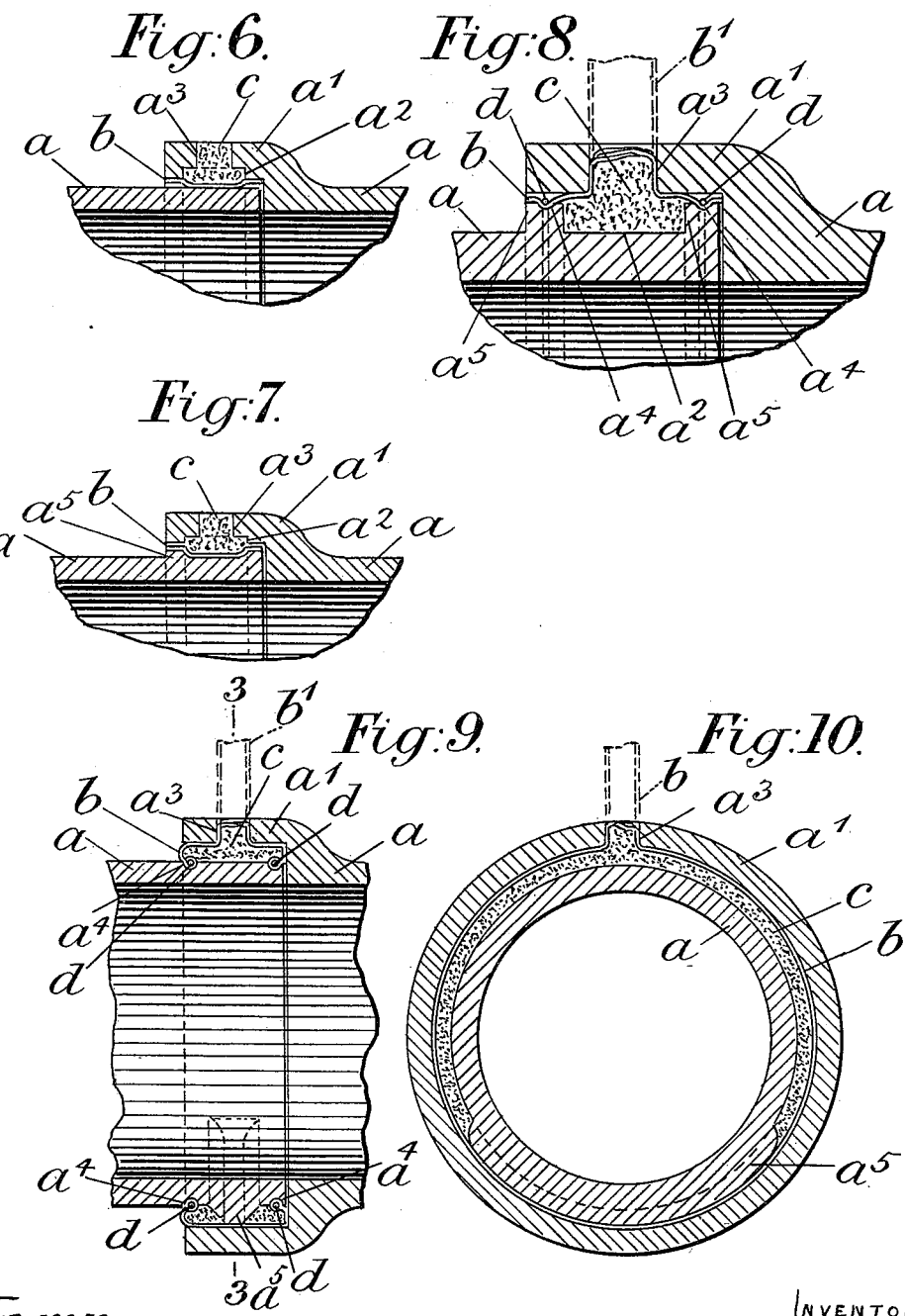

No. 615,149. Patented Nov. 29, 1898.
J. FARLEY.
JOINT FOR EARTHENWARE OR OTHER PIPES.
(Application filed Dec. 28, 1897.)
(No Model.) 3 Sheets—Sheet 3.

Witnesses:
S. C. Connor
P. W. Wright

Inventor
James Farley.
by his attorneys
Howson and Howson

UNITED STATES PATENT OFFICE.

JAMES FARLEY, OF HERTFORD, ENGLAND.

JOINT FOR EARTHENWARE OR OTHER PIPES.

SPECIFICATION forming part of Letters Patent No. 615,149, dated November 29, 1898.

Application filed December 28, 1897. Serial No. 663,961. (No model.)

*To all whom it may concern:*

Be it known that I, JAMES FARLEY, civil engineer, a subject of the Queen of Great Britain, residing at St. Andrew's street, Hertford, in the county of Herts, England, have invented certain new and useful Improvements in or Connected with the Joints of Earthenware or other Pipes, of which the following is a specification.

This invention relates to improvements in or connected with the joints of earthenware or other pipes, and has for its object to obtain a simple, inexpensive, and reliable means of making a perfect joint between adjacent sections or lengths of pipe or tubes or between lengths of pipes or tubes and unions, sockets, or the like. For this purpose in order to close a butt-joint a loose abutment ring or collar of iron or other suitable material is placed around the joint, and this abutment-ring is, upon the inner face thereof, formed with an annular groove or recess, with which communicates an opening formed in the abutment-ring. Upon the inner face of the abutment-ring is arranged a strip or ring of canvas or other suitable material, which is by its edges cemented to the inner face of the abutment-ring on each side of the annular groove or recess. Portland cement or other suitable cementing or jointing material in a semifluid or plastic state is forced through the opening in the abutment-ring into the annular groove or recess, thus filling the same and distending and forcing the canvas strip closely around the joint between the pipes, thereby covering and closing such joint. The cementing or jointing material by this operation is to some extent forced through the pores or interstices of the fabric constituting the strip or ring and adheres to the adjacent surfaces of the lengths of pipe or tube, while it also adheres to the surface and solidifies within the annular groove, thereby forming a solid joint perfectly tight against internal or external pressure.

In lieu of cementing the edges of the canvas strip to the abutment-ring such edges may be fixed therewith by means of rings of wire sprung into place or forced open by any suitable means, such as screw-threads upon the two parts of the meeting ends of the wire ring and a nut to force the same apart, while in some cases the inner face of the abutment-ring adjacent to the annular groove or recess may be formed with annular grooves to receive the wire-ring fastenings.

When employing a loose abutment-ring, as hereinbefore described, it is in some cases desirable to form it in two parts bolted together, so that it may be readily applied to tubes or pipes already fixed in position.

When the invention is to be applied to pipes or tubes in course of construction, the abutment-ring is or may be formed upon one length of pipe, so as to overlap the other length, thereby forming a kind of socketed end to the pipe, a suitable opening being left in such overlapping part, as hereinbefore described with respect to the loose abutment-ring. In this case the annular groove or recess is formed in the socket end of the pipe, and the strip of canvas or the like is affixed thereto, as hereinbefore described, while the spigot end of the pipe may, if desired, be provided with flanges, thereby forming a recess to receive the distended canvas strip, or as a modification the canvas strip may be fixed by its edges to the periphery of the flanges of the spigot end of the pipe, in which case the annular groove or recess in the socket may be dispensed with, or the canvas strip may be secured to the spigot end of the pipe by wires, while in order that the cement may be readily filled thereinto the canvas strip is provided with a canvas or other suitable tube which passes out through the opening in the socket end of the pipe through which the cementing material is filled into the annular groove or recess.

When employing wires to secure the canvas strip in position, the groove or recess in the annular socket or abutment-ring or that in the ends of the pipe may be dispensed with and the canvas strip may be otherwise arranged.

In order that the said invention may be more clearly understood and readily carried into effect, I will proceed, aided by the accompanying drawings, more fully to describe the same.

Figure 13:
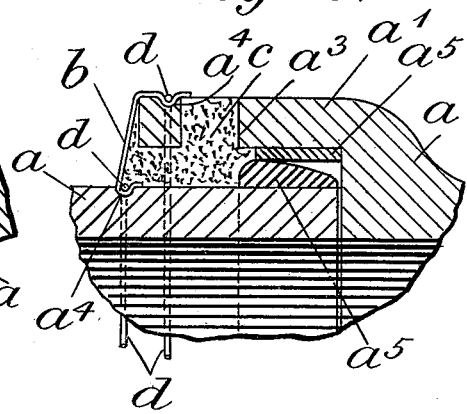
Figure 14:
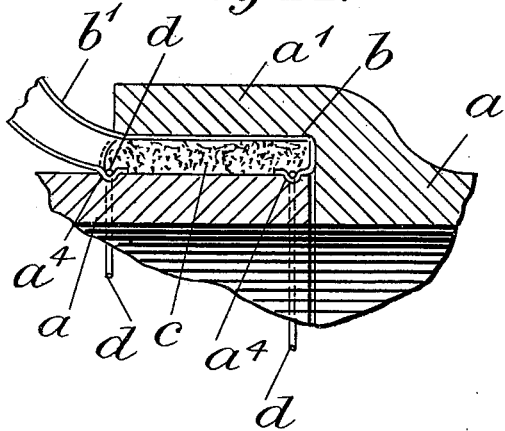
Figure 11:
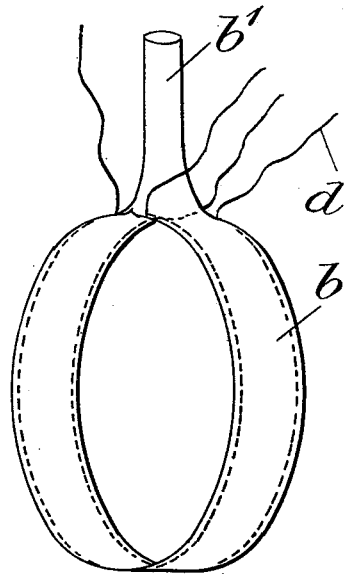

In the drawings, Figure 1 is a longitudinal view, partly in section, representing two lengths of pipe united by a butt-joint constructed according to the present invention. Fig. 2 is a transverse section thereof, taken on the line 1 1 of Fig. 1. Fig. 3 is a longitudinal section of a portion of a butt-joint, representing a slight modification. Fig. 4 is a transverse section thereof, taken on the line 2 2 of Fig. 3. Fig. 5 is a similar view to Fig. 3, representing a further slight modification. Fig. 6 is a longitudinal section of a portion of a socket-joint constructed according to the present invention. Fig. 7 is a similar view representing a further slight modification. Fig. 8 is a similar view representing a further slight modification. Fig. 9 is a similar but more complete view representing a further slight modification. Fig. 10 is a transverse section taken on the line 3 3 of Fig. 9. Fig. 11 is a separate perspective view of the canvas strip or ring employed in connection with the device illustrated in the last preceding figures; and Figs. 12, 13, and 14 are similar views to Fig. 6, representing further slight modifications.

The several figures, which are marked with similar letters of reference, are drawn to a variable scale.

Referring to Figs. 1 and 2, $a$ represents two sections or lengths of pipe which meet at their ends so as to form a butt-joint, and $a'$ represents a loose abutment-ring of iron, or it might be of other suitable material, which is placed around the joint, and this abutment-ring $a'$ is, upon the inner face thereof, formed with an annular groove or recess $a^2$, with which communicates an opening $a^3$, formed in the abutment-ring $a'$.

Upon the interior of the abutment-ring $a'$ is arranged a strip or ring of canvas or other suitable material $b$, preferably loosely woven, and this strip or ring of fabric $b$ is by means of any suitable cement by its edges fastened to the inner face of the abutment-ring $a'$ at the sides of the annular groove or recess $a^2$, so as to extend across the same.

Portland cement or other suitable cementing or jointing material $c$ in a semifluid or plastic state is forced through the opening $a^3$ in the abutment-ring $a'$ into the annular groove or recess $a^2$, thus filling the same and distending and forcing the canvas strip $b$ closely around and slightly into the joint between the two lengths of pipe $a$, thereby covering and effectually closing such joint. The cementing or jointing material $c$ by this operation is to some extent forced through the pores or interstices of the fabric constituting the strip or ring $b$ and adheres to the adjacent surfaces of the lengths of pipe or tube $a$, while it also adheres to the surface of the abutment-ring $a'$ within the annular groove $a^2$ and ultimately solidifies, thereby forming a solid joint perfectly tight against internal or external pressure.

The chief office of the strip or ring $b$ of fabric is to control the cementing material $c$ forced into the opening $a^3$ in the abutment-ring $a'$ by confining it within certain limits.

In the example given at Figs. 3 and 4 is shown a modified device for fixing the canvas or like strip or ring $b$ with the abutment-ring $a'$ in lieu of cementing the edges of the same thereto and which consists in the employment of split (or they might be other) rings $d$ of wire sprung into the annular groove $a^2$ of the abutment-ring $a'$, where they engage the free edges of the fabric strip or ring $b$ and bind the same against the abutment-ring, or the spring-rings $d$ may, if desired, be fixed to the edges of the strip or ring $b$ by sewing or otherwise. In this arrangement the strip or ring $b$ of fabric must be of sufficient width to fill or extend over the entire area of the annular groove $a^2$ in the abutment-ring $a'$. Instead of employing spring-rings $d$ for the purpose hereinbefore described split rings the meeting ends of which are provided with reverse screw-threads to receive a correspondingly-threaded nut or stud may be substituted therefor, as will be readily understood, or the rings may be expanded by other means than those hereinbefore described.

In the example given at Fig. 5 the strip or ring $b$ of fabric is fixed with the abutment-ring $a'$ by means of wire rings $d$ in a similar manner to that described with respect to the previous figures; but in this case the inner face of the abutment-ring $a'$, adjacent to the annular groove or recess $a^2$, is provided with annular grooves $a^4$ to receive the wire rings or fastenings $d$.

When employing a loose abutment-ring $a'$, as hereinbefore described, it may in some cases be desirable to form it in two parts bolted together, so that it may be readily applied to tubes or pipes already fixed in position.

In the example given at Fig. 6, which represents the invention applied to a specially-constructed pipe or tube, the abutment-ring $a'$ is formed upon one length of pipe $a$, so as to overlap the other length, thereby forming a kind of socketed end to the pipe, while a suitable filling-opening $a^3$ is formed in the socket part $a'$, as hereinbefore described with respect to the loose abutment-ring $a'$. In this case the annular groove or recess $a^2$ is formed in the socket end $a'$ of the pipe $a$, and the strip or ring of canvas $b$ or the like is affixed thereto by cementing the edges thereof to the inner face of the socket $a'$ on each side of the annular groove or recess $a^2$ in a similar manner to that described with respect to Figs. 1 and 2.

In the example given at Fig. 7 the device is similar to that lastly hereinbefore described, except that the spigot end of the pipe is provided with annular flanges $a^5$, thereby forming a recess between said flanges to receive the distended canvas strip or ring $b$.

In the example given at Fig. 8 the annular groove or recess in the socket end $a'$ of the pipe $a$ is dispensed with, but the spigot end of the pipe is formed with flanges $a^5$ similar to those lastly hereinbefore described and the canvas or other strip or ring $b$ is at its edges fixed to the flanges $a^5$ by means of wires $d$, which are sprung into or otherwise held in annular grooves $a^4$, formed in the flanges $a^5$ over the edges of the strip or ring $b$, while in order that the cement may be readily filled into the annular groove or recess $a^2$ in the pipe $a$ the canvas strip $b$ is provided with a canvas or other suitable neck or tube $b'$, which passes out through the opening $a^3$ in the socket end $a'$ of the pipe, and the cementing material is forced into the annular groove or recess $a^2$ through the pipe $b'$, which is afterward folded down into the opening $a^3$ or removed, as desired; or the grooves $a^4$ and wires $d$ may be dispened with and the canvas or other strip $b$ may be fastened to the flanges $a^5$ by means of cement, as in the preceding arrangements; or instead of fastening the canvas or other strip $b$ to the flanges $a^5$ such strip may be fastened to the socket $a'$, as will be readily understood; or when employing wires $d$ to secure the canvas strip in position the grooves or recesses $a^4$ in the socket $a'$ or in the spigot end of the pipe $a$ may be dispensed with and the canvas strip may be held by the wire rings $d$ in the annular groove or recess $a^2$ in a similar manner to that shown and described with respect to Figs. 3 and 4; or it may be similarly held in the annular groove or recess between the flanges $a^5$, and as these modified arrangements will be readily understood I have not thought it necessary to illustrate the same.

In the example given at Figs. 9 and 10 the annular groove $a^2$ in the socket $a'$ is dispensed with, and instead of centralizing the spigot end of the pipe $a$ with the socket by means of annular flanges $a^5$ in this case a flange, projection, or distance-piece $a^5$, extending partly around the spigot end of the pipe $a$, on the under side thereof, is employed. In this case also the strip is provided with a filling-tube $b'$ similar to that hereinbefore shown and described with respect to Fig. 8, and the edges of the canvas strip or ring $b$ are fixed with the spigot end of the pipe $a$ by means of strings, or they might be binding-wires $d$, which are fastened to the edges of the canvas strip or ring $b$ by passing loosely through hems on the strip, or they might be otherwise arranged so as to lie in annular grooves $a^4$, formed around the spigot end of the pipe $a$.

In the example given at Fig. 12 the device is similar to that lastly hereinbefore described, except that the flange or distance-piece $a^5$ is formed upon the interior of the socket end of the pipe and the annular grooves $a^4$ are also formed therein, while in lieu of the strings or binding-wires $b$ spring or other wire rings $d$ are substituted therefor.

It will be obvious that in lieu of a single flange or distance-piece $a^5$ several studs or distance-pieces arranged around either the socket or spigot end of the pipe may be substituted for the flange hereinbefore described.

In the example given at Fig. 13 the distance-pieces are annular and they are formed partly on the socket end of the pipe and partly on the spigot end thereof, so that they meet when the two parts are put together, and one or both of them is or are curved or beveled in such manner as to facilitate the putting together of the parts. In this case the canvas strip or ring is at one edge fixed to the spigot part of the pipe by means of a wire or string $d$, engaging a corresponding groove $a^4$ in the pipe $a$ beyond the spigot end, while the other edge of the canvas strip or ring $b$ is similarly fixed to the socket end of the pipe, and the filling-tube $b'$ to the canvas ring or strip $b$ is dispensed with and the cementing material is filled in through a filling-opening $a^3$ in the socket $a'$, while in cases where complete rings $a^5$ are not employed in order to prevent the filling material escaping between the pipes to the interior thereof a suitable packing or calking of tow or the like is employed.

In the example given at Fig. 14 the spigot end of the pipe is assumed to be held centrally and the filling-opening $a^3$ is dispensed with, while the canvas strip or ring $b$, which is provided with a filling-tube $b'$, is at its edges fixed by means of wires, strings, or the like $d$ in annular grooves $a^4$, formed in the spigot end of the pipe, while the filling-tube projects at the opening between the two pipes in convenient position for filling.

It will be obvious that the loose abutment-ring $a'$, hereinbefore shown and described with respect to Figs. 1 to 5, may, if desired, be formed without the annular groove or recess $a^2$ therein, in which case it will be provided with studs or distance-pieces $a^5$ to centralize it with relation to the two ends of the pipe $a$.

By the means hereinbefore described the necessity for the expensive systems heretofore employed for forming air and liquid tight joints is avoided and a perfectly sound joint is obtained with a much less expenditure of time and money.

What I claim is—

1. In a pipe-joint, the combination of a strip or ring of woven fabric, by its edges fastened to the interior surfaces of the parts and a filling of cement on one side of and percolating through the interstices of said fabric, substantially as described.

2. In a pipe-joint, the combination of a strip or ring of woven fabric, means for fastening said strip by its edges to the interior surface of the parts, and a filling of cement on one side of and percolating through the interstices of said fabric, substantially as described.

3. In a pipe-joint, the combination of a strip or ring of woven fabric, means for fastening said strip in position comprising grooves into which the edges of said fabric are forced, means for forcing the fabric into the grooves, and a filling of cement on one side of and percolating through the interstices of said fabric, substantially as described.

4. In a pipe-joint, the combination of a strip or ring of woven fabric, means for fastening said strip in position by its edges, comprising spring-rings which engage said edges, and a filling of cement on one side of and percolating through the interstices of such fabric, substantially as described.

5. In a pipe-joint, the combination of a strip or ring of woven fabric, by its edges and middle fastened to the interior surfaces of the parts, a filling-hole in the socket on each side of said middle part, the strip being so arranged that an annular space is arranged beneath said middle part into which cement flows through the fabric, and a filling of cement forced into said filling-openings, substantially as described.

JAMES FARLEY.

Witnesses:
GEO. S. VAUGHAN,
FRANK MORRIS.